R. B. WOLF.
PROCESS OF BLOWING ACID GASES.
APPLICATION FILED JAN. 28, 1911.
1,097,783.
Patented May 26, 1914.
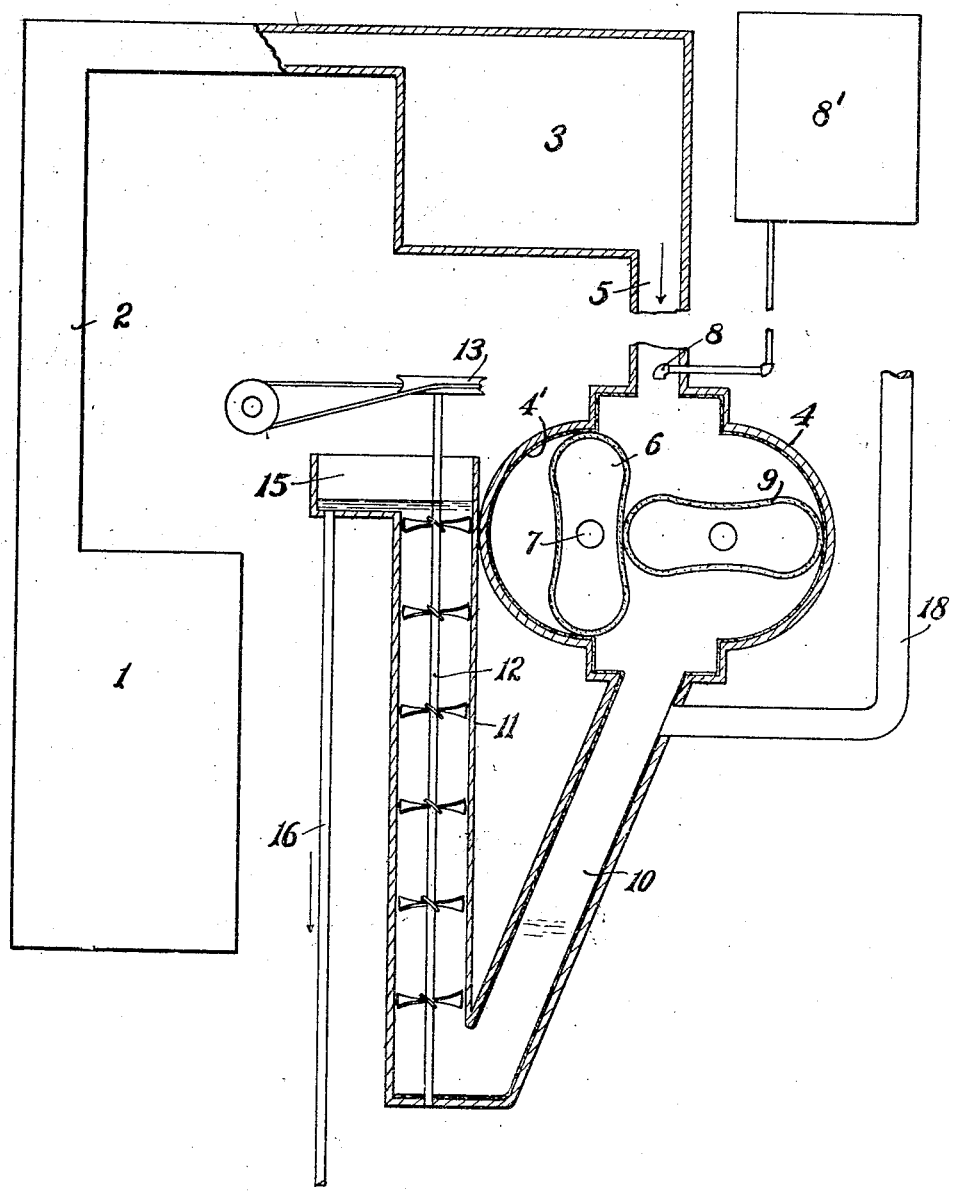
WITNESSES
R. B. Ellms.
L. D. Goodwin.
INVENTOR
Robert B. Wolf.
BY Alus Spear Jr.
ATT'Y.

UNITED STATES PATENT OFFICE.

ROBERT B. WOLF, OF BERLIN, NEW HAMPSHIRE, ASSIGNOR TO BURGESS SULPHITE FIBRE CO., OF PORTLAND, MAINE, A CORPORATION OF MAINE.

PROCESS OF BLOWING ACID GASES.

1,097,783. Specification of Letters Patent. Patented May 26, 1914.

Original application filed November 17, 1909, Serial No. 528,444. Divided and this application filed January 28, 1911. Serial No. 605,241.

*To all whom it may concern:*

Be it known that I, ROBERT B. WOLF, a citizen of the United States, residing at Berlin, county of Coos, State of New Hampshire, have invented certain new and useful Improvements in Processes of Blowing Acid Gases, of which the following is a specification.

This invention relates to the handling of gases and particularly to the forcing or blowing of a gas such as that employed in the acid system of a sulfite plant. In order to make clear the demands of actual practice, and to illustrate the uses of my blower in such practice, I shall particularly discuss it in connection with an acid system.

In the production of the acid to be used in a sulfite process it has been very much desired to handle the sulfur dioxid for the acid under more than atmospheric pressure. In my previous application, Serial Number 528,444, of which this application is a division, I have disclosed and discussed at length a complete apparatus for an acid system having this feature among others. In this system it is found of great advantage to handle the gas by a blower interposed between the burners, or, more specifically, between the coolers and the acid chambers. The action of the acid, however, upon any ordinary material of which a blower could be practically constructed is so great as to render the use of a blower of ordinary construction impossible. To this end, therefore, I have devised my process which makes it possible for me to secure the effects desired in my system and similar systems without any undue action by the gas on the parts of the apparatus which would otherwise be subject to destruction by the gas. In the present case I show the proper handling of the gas by a certain form of blower and fittings which I have found advantageous in practical use, the same being more fully described in the specification which follows.

In order to make clear my process and as illustrative of my invention, I have shown in the accompanying drawings the general form of construction which is found to be extremely efficient in actual use.

Throughout specification and drawings like reference numerals are employed to indicate corresponding parts and in the drawings I have shown partly in section and partly in elevation, a blower and its fittings, with so much of the gas end of the system as is necessary for an understanding of the action of the blower.

A casing 4 is provided within which impellers 6 are rotatably mounted on shafts 7. Sulfur dioxid is drawn into this casing from a cooler 3 to which the gas comes, through a pipe 2, from the burners 1. The pipe 11 is connected by a bent foot 10 at the lower side of the blower and, at about the point of connection, the pipe 18 is led off to the acid chambers.

Within the upright pipe 11 is rotatably mounted a shaft 12, provided with suitable stirrers, and at its top the pipe is provided with a spillway 15, from which the liquid may pass off through a pipe 16.

The blower casing 4 is provided with a spray nozzle 8 fed from a tank 8' which, in the system cited, would contain fresh lime water. The blower is, therefore, sprayed internally with a fine spray of lime water which maintains within the blower casing and on the impellers 6 a coating 4' of calcium monosulfite which, upon microscopic examination, is shown to be in fine crystalline form, the crystals being in the tetragonal system with one long and two short axes. The blower is, therefore, lined and coated with a layer of a protective nature which prevents any action of the acid gas on it.

With the above illustrative of the apparatus thus described, it will be seen that my process is continued in the following manner: The gas is drawn from the burners 1 by the impellers 6. Here, within the blower casing 4, I introduce a fine spray of lime water or milk of lime, thus forming within the casing calcium monosulfite which deposits upon the impellers and casing in fine crystalline form, forming the coating 9 as above described. From the casing 4 the gas is delivered under pressure passing in the form shown, through the pipe 18, to the absorption system, the liquid separating itself by gravity and falling into the bent foot 10 from which it rises to the upright pipe 11 and under the influence of the agitator 12 spills off through the top of the pipe 11 and the spillway 15 through the pipe 16 to any suitable tank where it may be preserved for subsequent use. It will, therefore, be seen that the essential steps of my process consist in introducing a neutralizing agent into the gases for the purpose of depositing an inactive coating upon the medium through which the gas is forced and which would otherwise be attacked.

Various forms of forcing and blowing apparatus may, of course, be used and the neutralizing agent may, of course, be varied in accordance with the peculiarities of the gas which is to be handled, all without departing from the spirit of my invention if within the limits of the appended claims.

What I, therefore, claim and desire to secure by Letters Patent is:—

1. The process of blowing gases containing corrosive constituents, which consists in drawing the gases into the blower and introducing a neutralizing agent into the gas as it enters the blower for the purpose of depositing an inactive coating on the blower and finally delivering the gas therefrom.

2. The process of blowing gases containing $SO_2$, which consists in drawing the gases into the blower and introducing an alkaline solution into the gas as it enters the blower for the purpose of depositing an inactive coating on the blower.

3. The process of blowing gases containing $SO_2$, which consists in drawing the gases into the blower and introducing a milk of lime into the gas as it enters the blower for the purpose of depositing an inactive coating on the blower and finally delivering the gas therefrom.

4. The process of forcing gases under pressure containing corrosive constituents, which consists in drawing the gases into the forcing medium and introducing a neutralizing agent into the gas at the time of contact with the forcing medium for the purpose of depositing an inactive coating thereon and finally delivering the gas therefrom.

In testimony whereof, I affix my signature in presence of two witnesses.

ROBERT B. WOLF.

Witnesses:
   CHARLES A. MARTIN,
   GEORGE ROBISCHEM.